(12) United States Patent  (10) Patent No.: US 9,058,313 B2
Kadowaki  (45) Date of Patent: Jun. 16, 2015

(54) TEST METHOD FOR DISTRIBUTED PROCESSING SYSTEM AND DISTRIBUTED PROCESSING SYSTEM

(71) Applicant: NEC Corporation, Minato-ku, Tokyo (JP)

(72) Inventor: Takayuki Kadowaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 13/754,236

(22) Filed: Jan. 30, 2013

(65) Prior Publication Data

US 2013/0238934 A1  Sep. 12, 2013

(30) Foreign Application Priority Data

Mar. 8, 2012  (JP) .................................. 2012-051256

(51) Int. Cl.
  *G06F 11/22* (2006.01)
  *G06F 11/36* (2006.01)
(52) U.S. Cl.
  CPC ........ *G06F 11/2294* (2013.01); *G06F 11/3672* (2013.01); *G06F 11/3688* (2013.01)
(58) Field of Classification Search
  CPC ............ G06F 11/2294; G06F 11/3688; G06F 11/3672; G06F 11/3602; G06F 11/263; G06F 11/261; G06F 11/2242
  See application file for complete search history.

(56) References Cited

U.S. PATENT DOCUMENTS

| | | | | |
|---|---|---|---|---|
| 5,371,883 A * | 12/1994 | Gross et al. | ................... | 714/38.1 |
| 5,544,310 A * | 8/1996 | Forman et al. | ................... | 714/31 |
| 6,668,275 B1 * | 12/2003 | Alsup et al. | ................... | 709/208 |
| 7,020,699 B2 * | 3/2006 | Zhang et al. | ................... | 709/223 |
| 2003/0233635 A1 * | 12/2003 | Corrie | ......................... | 717/124 |
| 2004/0060038 A1 * | 3/2004 | Johnston-Watt et al. | ..... | 717/120 |
| 2006/0075318 A1 * | 4/2006 | Romero et al. | ............... | 714/738 |
| 2009/0024873 A1 * | 1/2009 | Bag et al. | ........................ | 714/32 |

FOREIGN PATENT DOCUMENTS

JP  962626 A  3/1997

* cited by examiner

*Primary Examiner* — Nadeem Iqbal
(74) *Attorney, Agent, or Firm* — Sughrue Mion, PLLC

(57) ABSTRACT

A program on a plurality of processing units executes test input data. In the case where an error occurs so that processing of the program is not completed normally, it is determined that a test performed by using the input data failed. Meanwhile, in the case where an error does not occur so that processing of the program is completed normally, if the same feature pattern as that of the input data is stored in a storing unit which stores feature patterns of the executed input data, it is determined that the test performed by using the input data succeeded, while if the feature pattern is not stored in the storing unit, the result of the test performed by using the input data is judged based on the result of comparing the expected data with result data of the program.

15 Claims, 14 Drawing Sheets

FIG. 5

| PREVIOUS DATA (Dn) | INPUT DATA (In) | RESULT DATA (Dn') | PROGRAM NAME (PG) |
|---|---|---|---|
| 1000 | 100 | 1100 | ADDITION |
| 2000 | −200 | 1800 | ADDITION |
| 3000 | 300 | 3300 | ADDITION |
| 4000 | 400 | 4400 | ADDITION |
| ... | | | |

FIG. 9

| PREVIOUS DATA (Dn) | INPUT DATA (In) | RESULT DATA (Dn') | PROGRAM NAME (PG) |
|---|---|---|---|
| 1000 | 100 | 1100 | ADDITION |
| TOKYO | KANAGAWA | KANAGAWA | ADDRESS CHANGE |
| MAN, 100 | MAN +5% | 105 | POINTS |
| WOMAN, 200 | MAN +5% | 200 | POINTS |
| ... | | | |

| PROGRAM NAME (PG) | PREVIOUS DATA (Dn–Cls) | INPUT DATA (In–Cls) | PREVIOUS DATA (Dn'–Cls) | POLICY (Policy) |
|---|---|---|---|---|
| ADDITION | — | POSITIVE/ NEGATIVE OF VALUE | POSITIVE/ NEGATIVE OF VALUE | ALL POSITIVE/NEGATIVE OF VALUES MATCH |
| ADDRESS CHANGE | — | PREFECTURE | — | PREFECTURE OF In MATCH |
| POINTS | GENDER, VALUE | GENDER, VALUE | — | "GENDER" OF Dn MATCH AND "GENDER" OF In MATCH |
| ... | | | | |

FIG. 12

| PROGRAM NAME (Dn) | COMPARISON OMISSION RATE |
|---|---|
| ADDITION | 65% |
| ADDRESS CHANGE | 10% |
| POINTS | 90% |
| . . . | |

TEST METHOD FOR DISTRIBUTED PROCESSING SYSTEM AND DISTRIBUTED PROCESSING SYSTEM

INCORPORATION BY REFERENCE

This application is based upon and claims the benefit of priority from Japanese patent application No. 2012-051256, filed on Mar. 8, 2012, the disclosure of which is incorporated herein in its entirety by reference.

TECHNICAL FIELD

The present invention relates to a distributed processing system configured of a plurality of processing devices, and in particular, to a technique of testing whether or not a program executed on each processing device operates normally.

BACKGROUND ART

As a method for testing whether or not a program executed on a distributed processing system operates normally, a method has been known, in which data is input to a program executed on each processing device, and data obtained as a result of processing is compared with expected data which is generated separately and is expected as correct data.

For example, JP 9-62626 A (Patent Document 1) discloses a distributed processing system in which two programs, which are new one and old one and perform the same processing, are executed on a distributed processing system, and data obtained as a result of the processing by the new program is compared with data obtained as a result of the processing by the old program so as to test whether or not the new program operates normally.
Patent Document 1: JP 9-62626 A In order to test whether or not a program executed on a distributed processing system operates normally as described above, it has been necessary to separately generate expected data for the number of units of input data to be input to the program. Accordingly, in an environment where expected data corresponding to input data cannot be generated promptly due to a shortage of resources or the like, there is often a case where expected data is waited for, causing a problem that a longer time is required for the testing.

SUMMARY

An exemplary object of the present invention is to provide a test method for a distributed processing system, which solves the above-described problem, that is, a problem that a longer time is required for testing in an environment where expected data corresponding to input data cannot be generated promptly due to a shortage of resources or the like.

A test method for a distributed processing system, according to an exemplary aspect of the present invention, is a test method for a distributed processing system including a plurality of processing units that execute a program for performing predetermined processing in accordance with input data. The method is configured to include supplying the input data to the program running on the processing units;

generating a feature pattern of the input data, investigating whether or not a feature pattern which is the same as the generated feature pattern is stored in a storing unit which stores the feature pattern of the input data having been tested, and if the feature pattern which is the same as the generated feature pattern is not stored, calculating expected data which is expected as data to be obtained as a result of performing the predetermined processing in accordance with the input data; and in a case where an error occurs so that processing of the program is not completed normally, determining that a test performed by using the input data failed, and in a case where an error does not occur so that processing of the program is completed normally, if the feature pattern which is the same as the feature pattern of the input data is stored in the storing unit, determining that the test performed by using the input data succeeded, while if the feature pattern which is the same as the feature pattern of the input data is not stored in the storing unit, judging the result of the test performed by using the input data based on the result of comparing the calculated expected data with result data of the program.

A distributed processing system, according to another exemplary aspect of the present invention, is configured to include a plurality of processing units that execute a program for performing predetermined processing in accordance with input data;

an input data supplying unit that supplies the input data to the program of the processing units;

a storing unit that stores a feature pattern relating to the input data having been tested;

a comparison necessity determination unit that generates the feature pattern of the input data, and investigates whether or not the feature pattern which is the same as the generated feature pattern is stored in the storing unit;

an expected data calculation unit that, if the feature pattern which is the same as the feature pattern of the input data is not stored in the storing unit, calculates expected data which is expected as data to be obtained as a result of performing the predetermined processing in accordance with the input data; and a test result judging unit that, in a case where an error occurs so that processing of the program is not completed normally, determines that a test performed by using the input data failed, and in a case where an error does not occur so that processing of the program is completed normally, if the feature pattern which is the same as the feature pattern of the input data is stored in the storing unit, determines that the test performed by using the input data succeeded, while if the feature pattern which is the same as the feature pattern of the input data is not stored in the storing unit, judges the result of the test performed by using the input data based on the result of comparing the calculated expected data with result data of the program.

With the above-described configurations, the present invention is able to prevent a test time from becoming longer in an environment where expected data corresponding to input data cannot be generated promptly due to a shortage of resources or the like.

BRIEF DESCRIPTION OF DRAWINGS

FIG. 5 is a table showing exemplary data received by a test necessity determination unit in the distributed processing system according to the second exemplary embodiment of the present invention;

FIG. 9 is a table showing an example of data received by a test necessity determination unit (upper table) and examples of data types of test data and necessity determination criteria (lower table), in the distributed processing system according to the third exemplary embodiment of the present invention;

FIG. 12 is a table showing examples of comparison omission rates calculated by a distributed processing system according to the fourth exemplary embodiment of the present invention;

EXEMPLARY EMBODIMENTS

Next, exemplary embodiments of the present invention will be described in detail with reference to the drawings.

First Exemplary Embodiment

Figure 1:
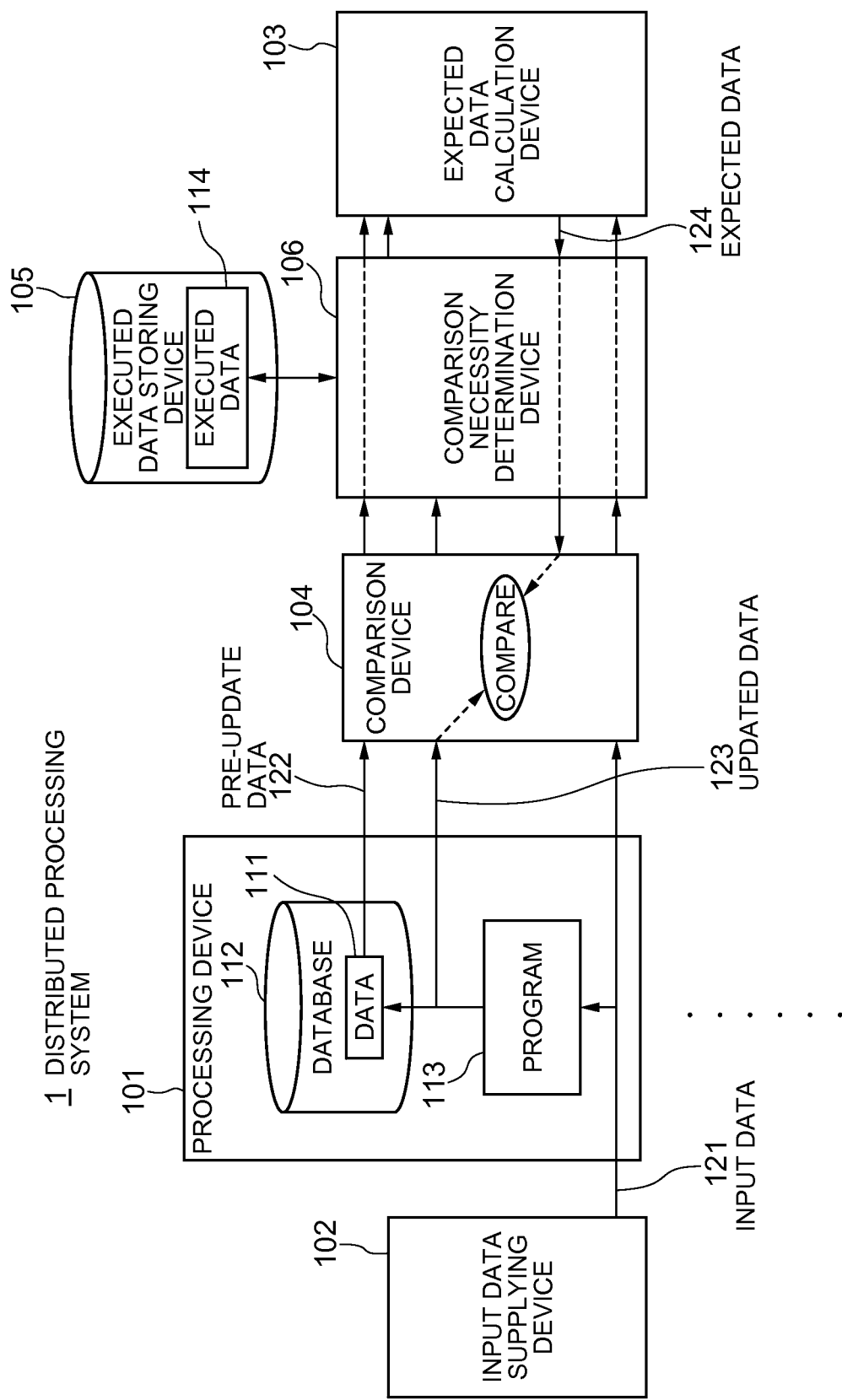
FIG. 1 is a block diagram showing a distributed processing system according to a first exemplary embodiment of the present invention.

Referring to FIG. 1, a distributed processing system 1 according to a first exemplary embodiment of the present invention includes a plurality of processing devices 101, an input data supplying device 102, an expected data calculation device 103, a comparison device 104, an executed data storing device 105, and a comparison necessity determination device 106.

Each of the processing devices 101 is an information processing device such as a server device, having a processor such as a microprocessor and a storing unit such as a semiconductor memory or a hard disk. Each of the processing devices 101 includes a database 112 storing data 111 to be processed, and a program 113 which updates the data 111 in the database 112 according to input data 121.

The input data supplying device 102 is connected with the respective processing devices 101 via networks not shown. The input data supplying device 102 has a function of supplying, to the program 113 of the respective processing devices 101, data to be used for testing the program 113 of the respective processing devices 101 as the input data 121.

The expected data calculation device 103 has a function of calculating data to be expected (expected data) 124 as updated data to be obtained when the program 113 updates the data 111 in the database 112 according to the input data 121. For example, if the program 113 is a program which updates the data 111 with a value obtained by an arithmetic addition performed on the data 111 and the input data 121, a value obtained by an arithmetic addition performed on the data 111 and the input data 121 is used as the expected data 124. The expected data calculation device 103 receives the input data 121 and pre-update data 122 from the comparison necessity determination device 106, calculates the expected data 124 from the input data 121 and the pre-update data 122, and returns the expected data 124 to the comparison necessity determination device 106.

For example, if the program 113 is a new program created by improving a conventional program (old program), the expected data calculation device 103 may be adapted to calculate, as the expected data 124, updated data which is a result of the processing performed by inputting the input data 121 to the old program.

The comparison device 104 has a function of determining a success or a failure of a test of the program 113 using the input data 121. When making the determination, the comparison device 104 first determines whether or not processing of the program 113 has been completed normally without any error. If an error occurs so that the processing of the program 113 has not been completed normally, the comparison device 104 determines that the test result of the program 113 using the input data 121 is a failure, that is, the program 113 is abnormal. On the other hand, if the processing of the program 113 has been completed normally without any error, the comparison device 104 determines whether or not the updated data 123 in the database 112, updated according to the input data 12 by the program 113, is correct. In order to make such a determination, the comparison device 104 notifies the comparison necessity determination device 106 of the input data 121, the pre-update data 122 in the database 112 to be updated according to the input data 121 by the program 113, and the updated data 123 in the database 112 updated according to the input data 121 by the program 113. Then, if the comparison device 104 receives the expected data 124 as a reply to the notification from the comparison necessity determination device 106, the comparison device 104 compares the received expected data 124 with the updated data 123, and based on the comparison result, determines whether the test using the input data 121 succeeded or failed. As such, if both units of data match, the comparison device 104 determines that the test succeeded, while if they do not match, the comparison device 104 determines that the test failed. Meanwhile, if the comparison device 104 receives a notification from the comparison necessity determination device 106 that a comparison is unnecessary as a reply to the notification, the comparison necessity determination device 106 determines that the test succeeded, without performing a comparison.

The executed data storing device 105 has a function of storing executed data 114 related to the input data 12 on which a test has been executed. In the case of the present embodiment, the executed data 114 is a feature pattern calculated from the input data 121 or the like in a manner as described below. Of course, the input data 12 or the like, which is the source of generating the feature pattern, may be used as the executed data 114.

The comparison necessity determination device 106 has a function of receiving the input data 121, the pre-update data 122, and the updated data 123 from the comparison device 104, and determining whether or not it is necessary to compare the updated data 123 with expected data in the test using the input data 121. When making a determination, the comparison necessity determination device 106 generates data referred to as a feature pattern from the input data 121, the pre-update data 122, and the updated data 123 in accordance with a predetermined rule, and investigates whether executed data 114 having a feature pattern which is the same as the generated feature pattern is stored in the executed data storing device 105. Then, if there is executed data 114 having the same feature pattern as the generated feature pattern, the comparison necessity determination device 106 determines that a comparison is unnecessary, and notifies the comparison device 104 of the fact. On the other hand, if there is no executed data 114 having the same feature pattern as the generated feature pattern, the comparison necessity determination device 106 adds executed data related to the input data 121 of this time into the executed data storing device 105, provides the expected data calculation device 103 with the input data 121 and the pre-update data 122 so as to allow the expected data calculation device 103 to calculate the expected data 124, and notifies the comparison device 104 of the calculated expected data 124.

A method of generating a feature pattern by the comparison necessity determination device 106, based on the input data 121, the pre-update data 122, and the updated data 123 in accordance with a predetermined rule, will be described in detail. In the below description, it is assumed that the input data 121 is x, the pre-update data 122 is y, the updated data 123 is z, and a feature pattern generated therefrom is w.

The comparison necessity determination device 106 generates data other than a combination of data "x, y, z" which is the same as a combination of the input data x, the pre-update data y, and the updated data z, as a feature pattern w characterizing a combination of the input data x, the pre-update data y, and the updated data z. More specifically, the comparison necessity determination device 106 judges the category to which the input data x, the pre-update data y, and the updated data z belong to, and determines that the judged category to be the feature pattern w. For example, in the case where a set of input data x can be classified into n types of categories "g1" to "gn", if any input data x is classified as a particular category "gi", the category "gi" may be determined to be a feature pattern w generated from such input data x. For example, in the case where a set of input data x can be classified into two categories such as "positive integer" and "negative integer", if any input data x is a positive integer, a category "positive integer" may be used as a feature pattern w of such input data x. In the case where a set of input data x is classified by gender, if any input data x is male, a category "male" may be used as a feature pattern of such input data x. In the case where a set of input data x can be classified by prefectures, if any input data x is Tokyo, a category "Tokyo" may be used as a feature pattern of such input data x. This also applies to pre-update data y an updated data z.

While the feature pattern w is generated based on all of the input data x, the pre-update data y, and the updated data z in the present embodiment, the feature pattern w may be generated based on any two of the input data x, the pre-update data y, and the updated data z, or may be generated based on any one of the input data x, the pre-update data y, and the updated data z. If the feature pattern w is generated based on any one of the input data x, the pre-update data y, and the updated data z, it is desirable to select input data x in such a manner that a different feature pattern w is generated for different input data x. Further, if the feature pattern w is generated using two of the input data x, the pre-update data y, and the updated data z, it is desirable to select input data x and pre-update data y in such a manner that a different feature pattern is generated for a different combination of input data x and pre-update data y.

The input data supplying device 102, the expected data calculation device 103, the comparison device 104, the executed data storing device 105, and the comparison necessity determination device 106, described above, may be implemented by physically different information processing devices, respectively. Meanwhile, any two of, three of, four of, or all of the input data supplying device 102, the expected data calculation device 103, the comparison device 104, the executed data storing device 105, and the comparison necessity determination device 106 may be implemented by the physically same information processing device. Alternatively, any one of, two of, three of, four of, or all of the input data supplying device 102, the expected data calculation device 103, the comparison device 104, the executed data storing device 105, and the comparison necessity determination device 106 may be implemented by an information processing device which is the same as any processing device 101.

Further, the expected data calculation device 103, the comparison device 104, the executed data storing device 105, and the comparison necessity determination device 106, described above, may be provided in common to all processing devices 101. Meanwhile, any one of, two of, three of, or all of the expected data calculation device 103, the comparison device 104, the executed data storing device 105, and the comparison necessity determination device 106 may be provided to each processing device 101 or provided in common to some processing devices 101.

Figure 2:
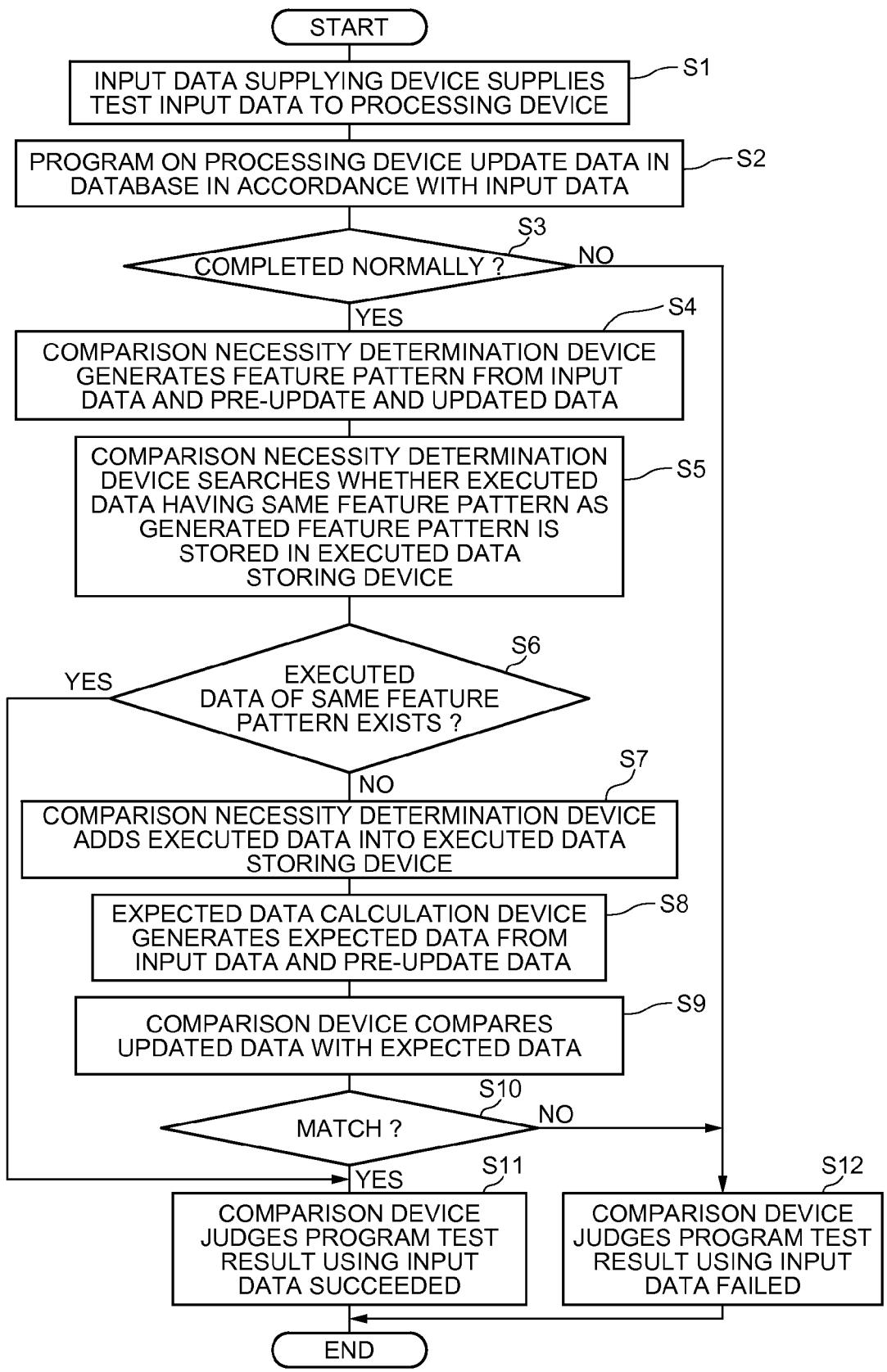
FIG. 2 is a flowchart showing a test procedure in the distributed processing system according to the first exemplary embodiment of the present invention.

Next, a procedure of a test method, to be executed by the distributed processing system according to the present embodiment, will be described with reference to FIG. 1 and the flowchart of FIG. 2. It should be noted that when a test using a series of input data 121 begins, the stored content of the executed data storing device 105 is cleared to a state where no executed data 114 is stored at all.

First, the input data supplying device 102 supplies input data 121 to be used for testing to each processing device 101 (step S1). For example, the input data supplying device 102 has a set of input data 121 to be used for testing, and takes out one unit of input data 121 from the set and supplies it to one processing device 101, while supplies another unit of data, taken from the set, to another processing device 101. In this way, the input data supplying device 102 performs testing of all processing devices 101 in parallel. Hereinafter, by focusing on one processing device 101, a procedure of a test using the data input to such a processing device 101 will be described.

The processing device 101 executes a program 113 using data 121, having been input, as input data. The program 113 performs calculation and logical operation in accordance with a programmed procedure, and updates data 111 in the database 112 according to the input data 121 (step S2). The comparison device 104 determines whether or not the processing of the program 113 has been completed normally without any error (step S3). If an error occurred, the comparison device 104 determines that the test of the program 113 using the input data 121 of this time ended in failure (step S12). On the other hand, even when the test has been completed normally without any error, as it is not always the case that the calculation result of the program 113 is correct, the comparison device 104 continues the test procedure using the input data 121 of this time.

First, the comparison device 104 notifies the comparison necessity determination device 106 of the input data 121, the pre-update data 122, and the updated data 123, and the comparison necessity determination device 106 generates a feature pattern from the notified data (step S4). Next, the comparison necessity determination device 106 searches the executed data storing device 105 and investigates whether or not executed data having a feature pattern which is the same as the generated feature pattern is stored therein (step S5). Then, if the executed data of the same feature pattern is stored in the executed data storing device 105, the comparison necessity determination device 106 notifies the comparison device 104 that comparison is unnecessary, and the comparison device 104 determines that the test of the program 113 using the input data 121 of this time ended successfully (steps S6, S11).

On the other hand, if executed data of the same feature pattern is not stored in the executed data storing device 105, the comparison necessity determination device 106 adds the generated feature pattern into the executed data storing device 105 as new executed data (step S7). Then, the comparison necessity determination device 106 notifies the expected data calculation device 103 of the input data 121 and the pre-update data 122, and the expected data calculation device 103 calculates expected data 124 based on the input data 121 and the pre-update data 122, and notifies the comparison device 104 of the expected data 124 via the comparison necessity determination device 106 (step S8). The comparison device 104 compares the updated data 123 with the expected data 124 (step S9). Then, if the updated data 123 and the expected data 124 match, the comparison device 104 determines that the test of the program 113 using the input data 121 of this time ended successfully (steps S10, S11). However, if the updated data 123 and the expected data 124 do not match, the comparison device 104 determines that the test of the program 113 using the input data 121 of this time ended in failure (steps S10, S12).

In this way, the test of the program 113 of the processing device 101 using one unit of input data 121 ends. If the test result is a success, a similar test will be performed repeatedly using another unit of input data 121. If the test result is a failure, the test procedure is terminated, and investigation of the cause of the failure, identification of the failed part, and improvements thereof will be conducted, for example.

Next, advantageous effects of the present embodiment will be described.

According to the present embodiment, even if expected data corresponding to input data cannot be generated promptly due to a resource shortage or the like, it is possible to prevent a test period from becoming longer. This is because as the system is configured not to generate new expected data if executed data having the same feature pattern as the feature pattern generated from the input data 121, the pre-update data 122, and the updated data 123 is stored in the executed data storing device 105, frequency of generating expected data is reduced, so that frequency of waiting for expected data is reduced.

Further, according to the present embodiment, it is possible to perform testing sufficiently compared with the case where the number of units of data to be compared is simply reduced. One reason is that the program 113 is executed with respect to every input data to check whether or not processing is completed normally without any error. Thereby, it is possible to find a failure that an error occurs with respect to a pattern of particular input data. Another reason is that in the case where program processing is completed normally without any error, if the feature pattern generated from the input data 121, the pre-update data 122, and the updated data 123 of this time differs from the feature patterns generated from input data and the like having been tested, in other words, if the input data and the like of this time are of different category or different pattern from that of the input data and the like having been tested, the updated data 123 which is a result of the program processing and the expected data 124 are compared so as to check whether or not the result of the program processing is correct. On the other hand, if the feature pattern generated from the input data and the like is the same as the feature pattern generated from the input data and the like having been tested, in other words, if the input data and the like are of the same category or the same pattern as that of the input data and the like having been tested, as the possibility of the processing result of the program being correct is high, it is determined that the result of the test of the program ended successfully without performing comparison between the updated data 123 which is the processing result of the program and the expected data 124.

While the program 113 to be tested is a program to update the database 112 in the present embodiment, it is possible to test a program not involving updating of a database. This means that the present invention is capable of performing a test of any program performing predetermined processing based on input data.

Further, while the program 113 to be tested is one type of program in the present embodiment, a plurality of types of programs may be tested. In that case, the comparison necessity determination device 106 may have a rule for generating a feature pattern corresponding to an identifier specifying a program, and generate a feature pattern in accordance with the rule. Further, the executed data 114 may include an identifier specifying a program, and the comparison necessity determination device 106 may investigate whether or not executed data 114, having the same identifier as the identifier specifying the program to be tested and also having the same feature pattern as the generated feature pattern, is stored in the executed data storing device 105.

Second Exemplary Embodiment

Next, a second exemplary embodiment of the present invention will be described in detail. In this embodiment, description will be given on a test method for confirming that the program of a new system has the same result as the program of an old system in the case where the old system, in which input data written on a file is reflected on a database through batch processing, is transformed to the new system in which respective units of data in a database are executed simultaneously in parallel on individual environments which are divided and arranged respectively.

First, a problem to be solved by the present embodiment will be described.

In recent years, with the development of the distributed processing technique, it is possible to reduce the processing time of existing services by performing distributed parallel processing on a large quantity of data by means of a plurality of servers. As such, a movement of transferring an existing system to a new system utilizing such a distributed processing technique has been active. While it is necessary to check and ensure that the processing of the existing system is realized similarly in the new system, there is a case where it is impossible to know the specification of the existing system due to lack of system specification, lack of engineers who are entirely familiar with the system, and so on. In that case, it is possible to check that the same function as that of the existing system is implemented in the new system by performing a test using the input data and the processing result of the existing system to verify that a result of inputting the same data into the new system is the same as that of the existing system.

However, an access to the old database (DB) used by the old system, in order to compare the calculation result by the program of the new system with the result of calculation by the old program, puts a load on the old DB in operation, causing degradation of the service performance provided by the old system, for example. Further, in order to prevent such an adverse effect on the old system, in the case of preparing a single emulation environment in which an environment which is completely the same as that of the old system is emulated and calculating an emulation result by the old program to check the validity of the calculation result of the new program, as the new system performs distributed parallel processing on a large quantity of data, a massive load is put on the single emulation environment at once, so that calculation of the emulation result by the old program cannot be completed in time. As such, the emulation environment becomes a bottleneck.

Figure 3:
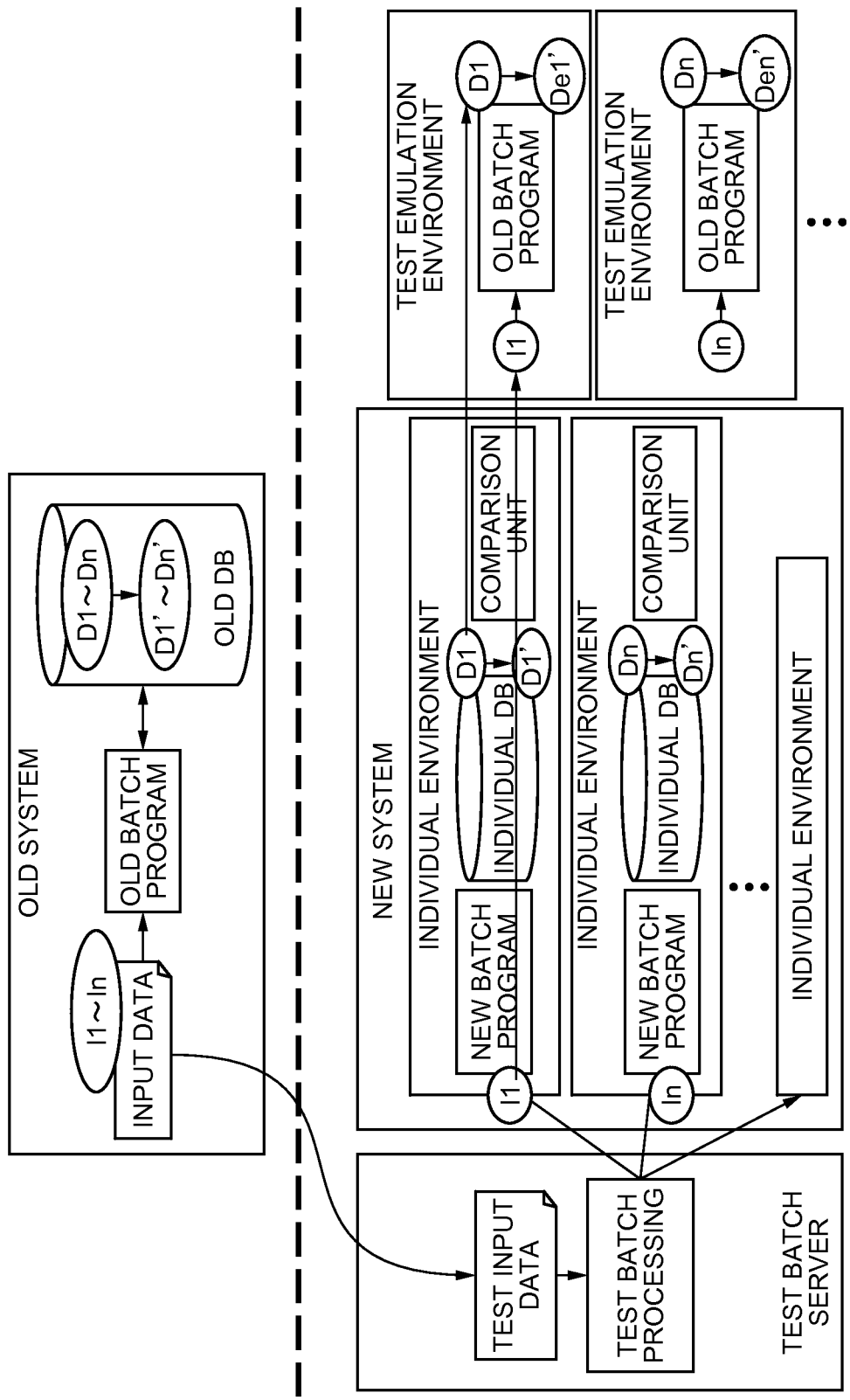
FIG. 3 is a block diagram showing a distributed processing system related to the present invention.

FIG. 3 shows a distributed processing system related to the present invention. The distributed processing system shown in FIG. 3 is a system for validating a new system when transferring an old system, in which data D1~Dn in an old DB is updated to D1'~Dn' with input data I1~In input to an old batch program, into the new system configured of a group of individual environments in which the respective units of data D1~Dn are processed in a distributed and parallel manner by the new program individually. The outline of the operation of the distributed processing system related to the present invention, shown in FIG. 3, will be described below.

Test input data is prepared by converting input data beforehand, and an instruction is made to perform distributed parallel processing simultaneously on the test input data on individual environments through test batch processing. An individual environment receiving the input data I1 updates the previous data D1 to D1' by the new program. Next, by the comparison unit, the data I1 and the data D1 are transmitted to a test emulation environment. Upon receipt of the data I1 and the data D1, the test emulation environment updates the original data D1 to De1' using the old program, and returns the data to the comparison unit. Upon receipt of the data De1', the comparison unit compares the data D1' with the data De1', and if they match, the comparison unit determines that the test succeeded, while if they do not match, the comparison unit determines that the test failed. According to success or failure of the comparison results with respect to all data, it is verified that the new system has the same result as that of the old system.

As described above, as execution of the new program in individual environments is performed in a distributed and parallel manner, execution of the old program in the test emulation environments is also performed in parallel. At that time, if the emulation environments are not able to perform parallel processing at the same level as that of the new system, the test emulation environments become a bottleneck.

Further, in order to realize emulation environments in which distributed parallel processing is able to be performed in the same manner as that of the new system, it is necessary to prepare emulation environments corresponding to the size of the new system, whereby the cost thereof becomes too high for a test environment.

On the other hand, in the case where an emulation result by the old program is prepared beforehand, as it is necessary to generate an emulation result with respect to a large quantity of data, a long time is needed to generate it beforehand. Further, as it is necessary to find an emulation result, to be compared with a result calculated in a distributed individual environment of the new system, from a large quantity of emulation results, the cost for the search becomes also high.

As such, in the present embodiment, in the case of testing a system for distributed parallel processing, by automatically narrowing whether or not to calculate an emulation result by the old program to be compared with individual units of result data executed in parallel, at the time of testing, it is possible to calculate an emulation result by the old program with the minimum resources. Further, the present embodiment enables to perform a test within a processing time which does not affect the advantages of the distributed processing environments provided by the new system.

According to the present embodiment, it is determined whether or not a comparison with emulation result data by the old program is required at the time of testing, and only when emulation result data by the old program is required, an emulation result by the old program is generated using the emulation environment and the result is compared with the test result. Thereby, it is possible to efficiently perform verification by the parallel processing of a large quantity of test data using the minimum emulation environment.

Hereinafter, the configuration of operation of the present embodiment will be described in detail.

Description of Configuration

Figure 4:
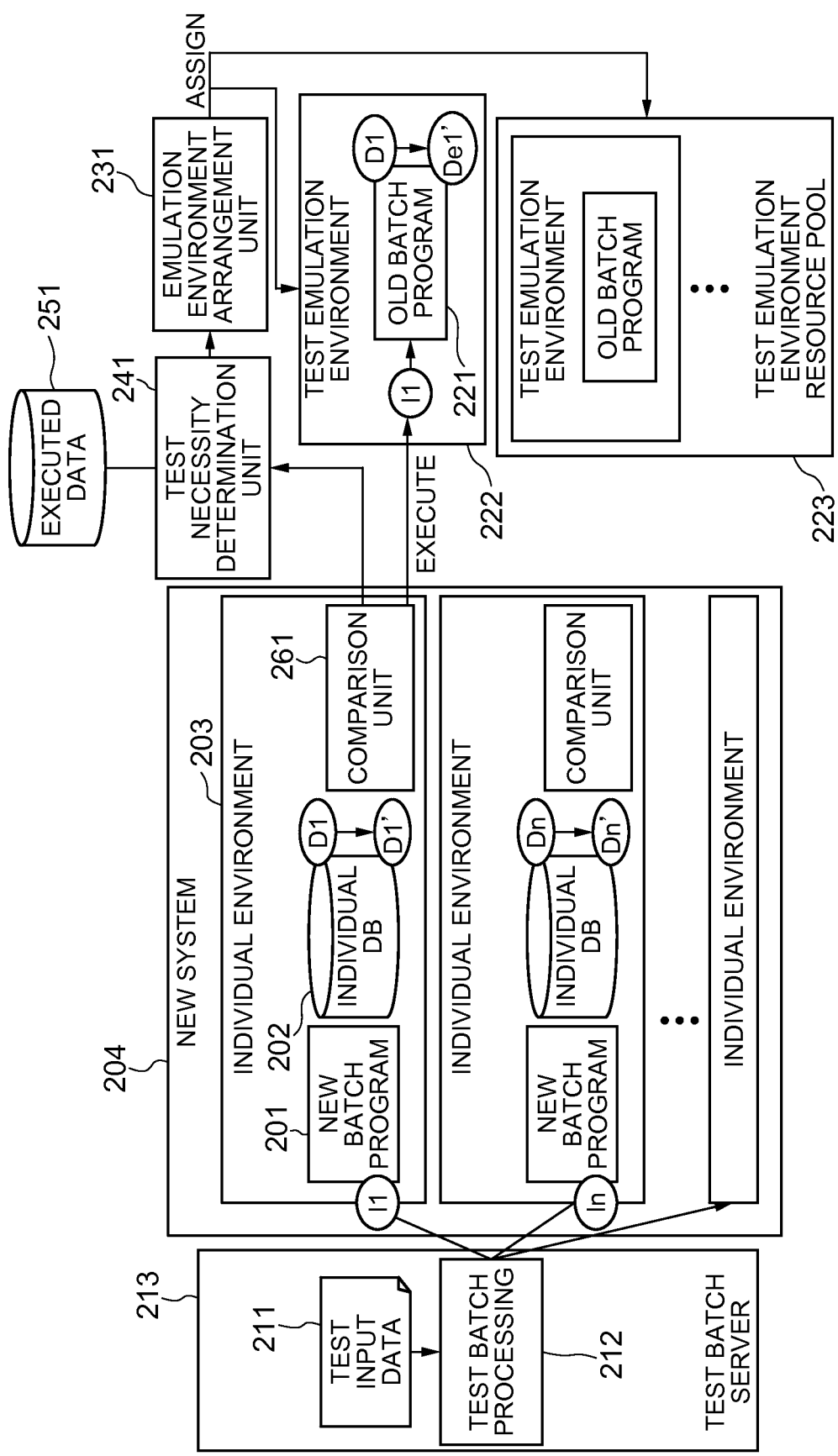
FIG. 4 is a block diagram showing a distributed processing system according to a second exemplary embodiment of the present invention.

Referring to FIG. 4, a distributed processing system according to the present embodiment includes a new system 204 to be tested, having a plurality of individual environments 203 each of which receives one unit of input data In and updates previous data Dn in an individual DB 202 to result data Dn', by a new batch program 201. The distributed processing system also includes a batch server 213 to which test input data 211 is input and which executes test batch processing 212, test emulation environments 222 each of which calculates an emulation result De1' by the old batch program 221, a test emulation environment resource pool 223 which maintains the test emulation environments 222 in an executable state, an emulation environment arrangement unit 231 which dynamically assigns the test emulation environments 222 from the test emulation environment resource pool 223 upon request, a test necessity determination unit 241 which determines whether or not an emulation result by the test emulation environment resource pool 223 should be generated in the test emulation environment 222, executed data 251 in which an emulation result by the old batch program 221 is generated and data compared with a calculation result by the new batch program 201 is recorded, and a comparison unit 261 which compares an emulation result by the old batch program 221 with a calculation result by the new batch program 201 and determines whether the test succeeded or failed.

FIG. 5 shows exemplary configurations of data received by the test necessity determination unit 241 from the comparison unit 261. These examples show the case where the new batch program 201 has a configuration of performing addition processing. The data to be received is a combination of previous data, input data, result data, and a program name.

Description of Operation

Regarding all units of test input data 211, a request for simultaneous processing is given to the new system 204 by the batch processing 212 on the test batch server 213.

The new system 204 performs processing on all units of data simultaneously on the individual environments 203 corresponding to the respective units of data. In this step, on each of the environments 203, the new batch program 201 is executed using one unit of input data In as an input to change one unit of previous data Dn to data Dn'.

On each of the environments 203, the comparison unit 261 transmits the test input data In, the previous data Dn, the result data Dn', and a program name PG, to the test necessity determination unit 241.

Figure 7:
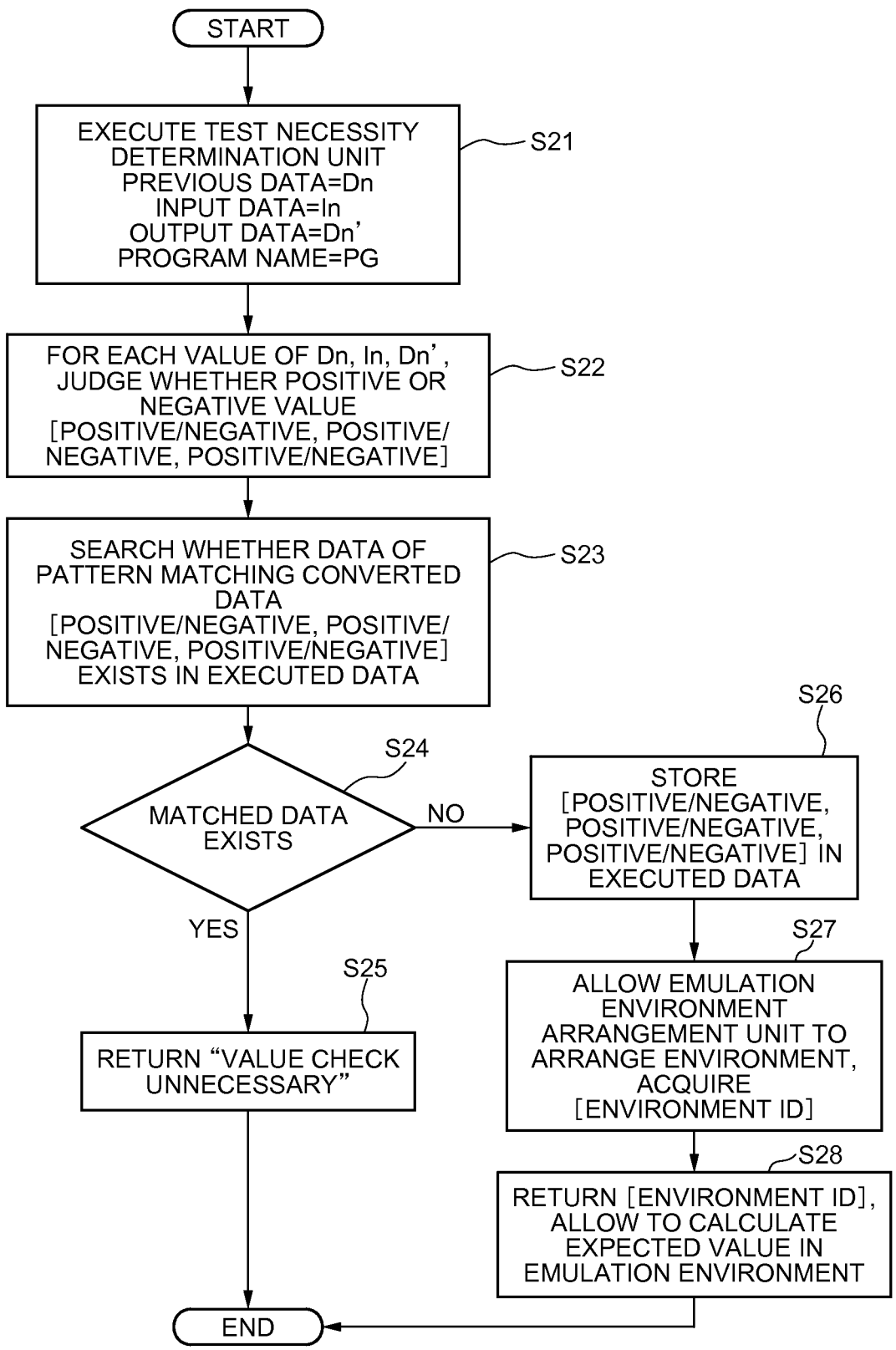
FIG. 7 is a flowchart showing the operation of the test necessity determination unit in the distributed processing system according to the second exemplary embodiment of the present invention.

In accordance with the flowchart of FIG. 7, the test necessity determination unit 241 determines that whether each of the received units of data [Dn, In, Dn'] has a positive value or a negative value and converts it into a positive/negative pattern (steps S21, S22), and checks whether a pattern which is the same as the positive/negative pattern is stored in the executed data 251 (step S23). If the pattern is stored, the test necessity determination unit 241 replies that comparison with the emulation result by the old program 221 is unnecessary, whereby the execution in that environment ends normally (steps S24, S25). On the other hand, if data of the same pattern is not stored in the executed data 251, the test necessity determination unit 241 stores the positive/negative pattern of this time in the executed data 251 (step S26), and instructs the emulation environment arrangement unit 231 to assign a test emulation environment (step S27). Then, in the assigned test emulation environment, the test necessity determination unit 241 executes the old program 221 using the data [Dn, In, Dn', PG], calculates an emulation result by the old program 221, and returns the emulation result to the comparison unit 261 (step S28).

When the comparison unit 261 receives the emulation result by the old program 221, the comparison unit 261 checks that the data Dn' calculated by the new program 201 matches the emulation result by the old program 221.

By performing such processing simultaneously, it is verified that the same result as that of the existing system is obtained on the new system 204.

Figure 6:
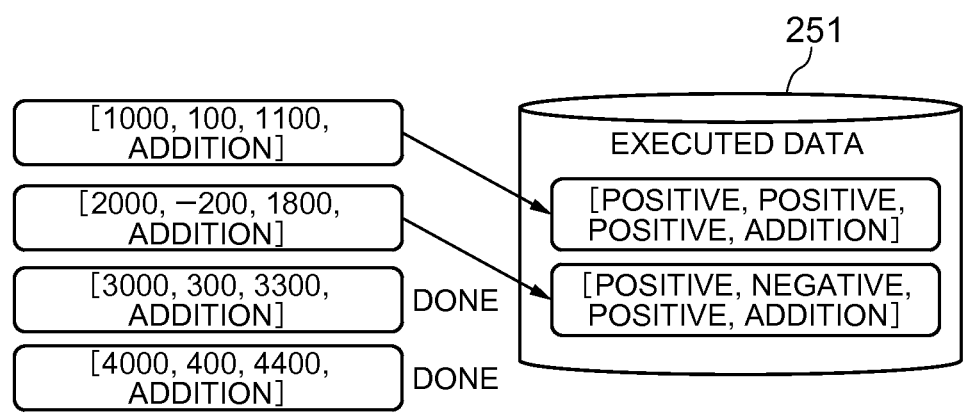
FIG. 6 is an illustration showing an operation of the test necessity determination unit in the distributed processing system according to the second exemplary embodiment of the present invention.

FIG. 5 shows examples of data provided to the test necessity determination unit 241. For the sake of explanation, the case of sequentially executing those units of data from the data of the upper row will be described with reference to FIG. 6. When the test necessity determination unit 241 receives data [1000, 100, 1100, addition], the test necessity determination unit 241 first determines whether each piece of data [Dn, In, Dn'] is positive or negative, and converts the data into [positive, positive, positive, addition]. As the data [positive, positive, positive, addition] is not in the executed data, the test necessity determination unit 241 registers the data [positive, positive, positive, addition] in the executed data, calculates an emulation result by the old program 221 using the test emulation environment 222, and returns the emulation result to the comparison unit 261. Similarly, regarding data [2000, −200, 1800, addition], as data [positive, negative, positive, addition] does not exist in the executed data, the test necessity determination unit 241 calculates a test emulation result. Then, the test necessity determination unit 241 convers data [3000, 300, 3300, addition]. This data is converted to [positive, positive, positive, addition]. As this data exists in the executed data, calculation of an emulation result by the old program 221 is omitted.

As described above, as calculation of an emulation result by the old program 221 can be omitted for some units of data, it is possible to reduce the resources of the test emulation environments 222 to be used and to solve the bottleneck of the test emulation environments.

Description of Effects

According to the present embodiment, the following advantageous effects can be achieved:

(a) By determining the necessity of generating an emulation result by the old program to perform verification at the time of execution, and generating an emulation result by the old program only when it is required, testing can be performed efficiently even when a large quantity of data is executed in parallel simultaneously.

(b) Compared with the case of generating emulation result data by the old program in advance, a total processing time (period from the beginning until the end of the test including collection of emulation result data by the old program) can be reduced.

(c) As it is not necessary to access the old system, testing can be performed in parallel with the old system in operation.

(d) As it is checked that an operation similar to that of the existing system is realized, the test can be performed even if the specification of the existing system is not clearly known, and further, there is no need to create test items.

Third Exemplary Embodiment

Figure 8:
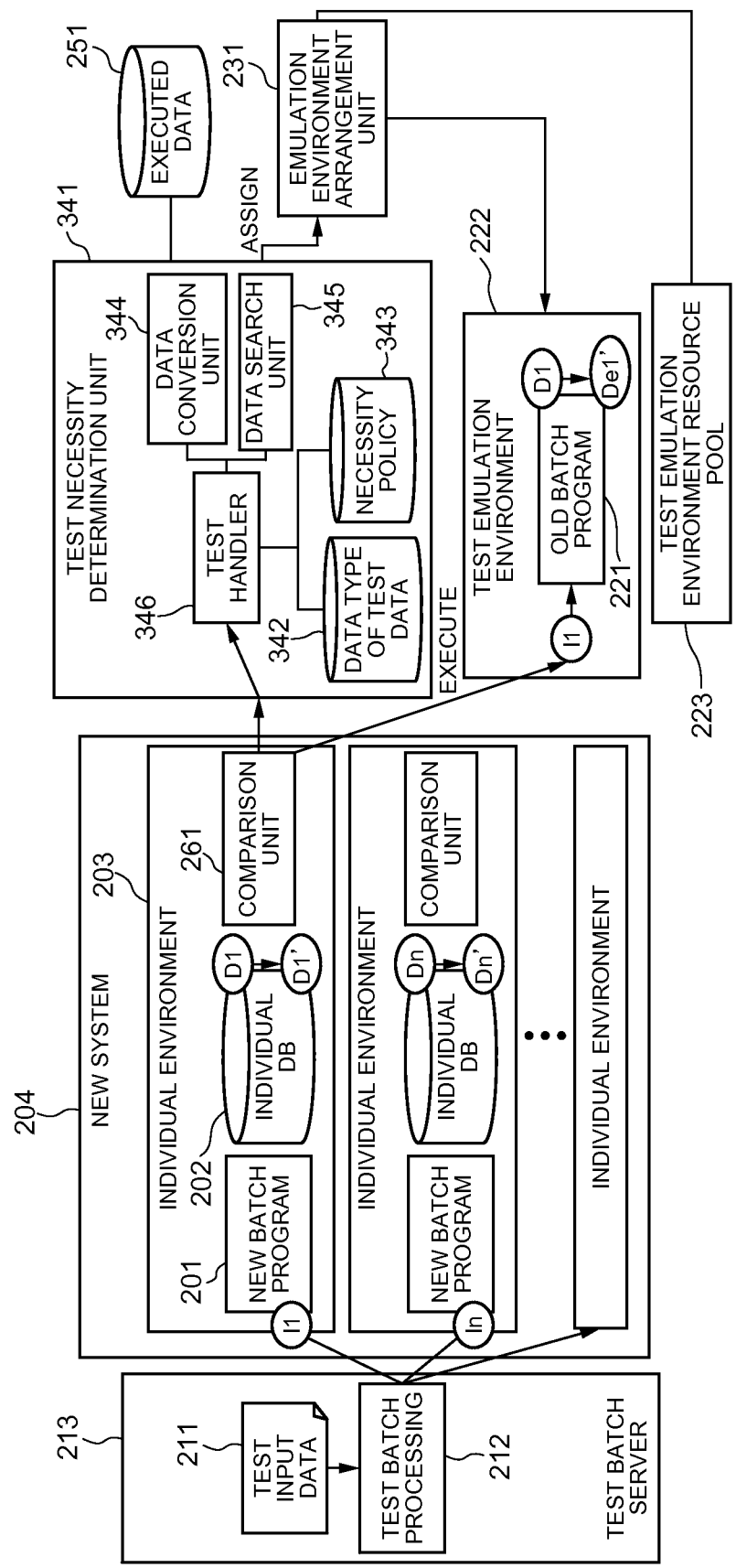
FIG. 8 is a block diagram showing a distributed processing system according to a third exemplary embodiment of the present invention.

FIG. 8 is a block diagram showing a distributed processing system according to a third exemplary embodiment of the present invention. In the present embodiment, the types of data to be handled by each program and the test necessity policy are defined in advance, and the present embodiment includes a test necessity determination unit 341 which determines the test necessity according to such a definition.

The test necessity determination unit 341 includes a data type 342 of test data, a necessity policy 343, a data conversion unit 34, a data search unit 345, and a test handler 346.

The data type 342 of test data includes the type of data of a feature pattern generated from previous data, input data, and result data, corresponding to a program name of the new batch program 201. Further, the necessity policy 343 includes a policy for determining the necessity.

The data conversion unit 344 has a function of generating a feature pattern according to the data type described in the data type 342 of the test data. The data search unit 345 has a function of searching whether the feature pattern generated by the data conversion unit 344 exists in the executed data 251, according to the necessity policy 343. The test handler 346 handles control of the entire test necessity determination unit 341.

Figure 10:
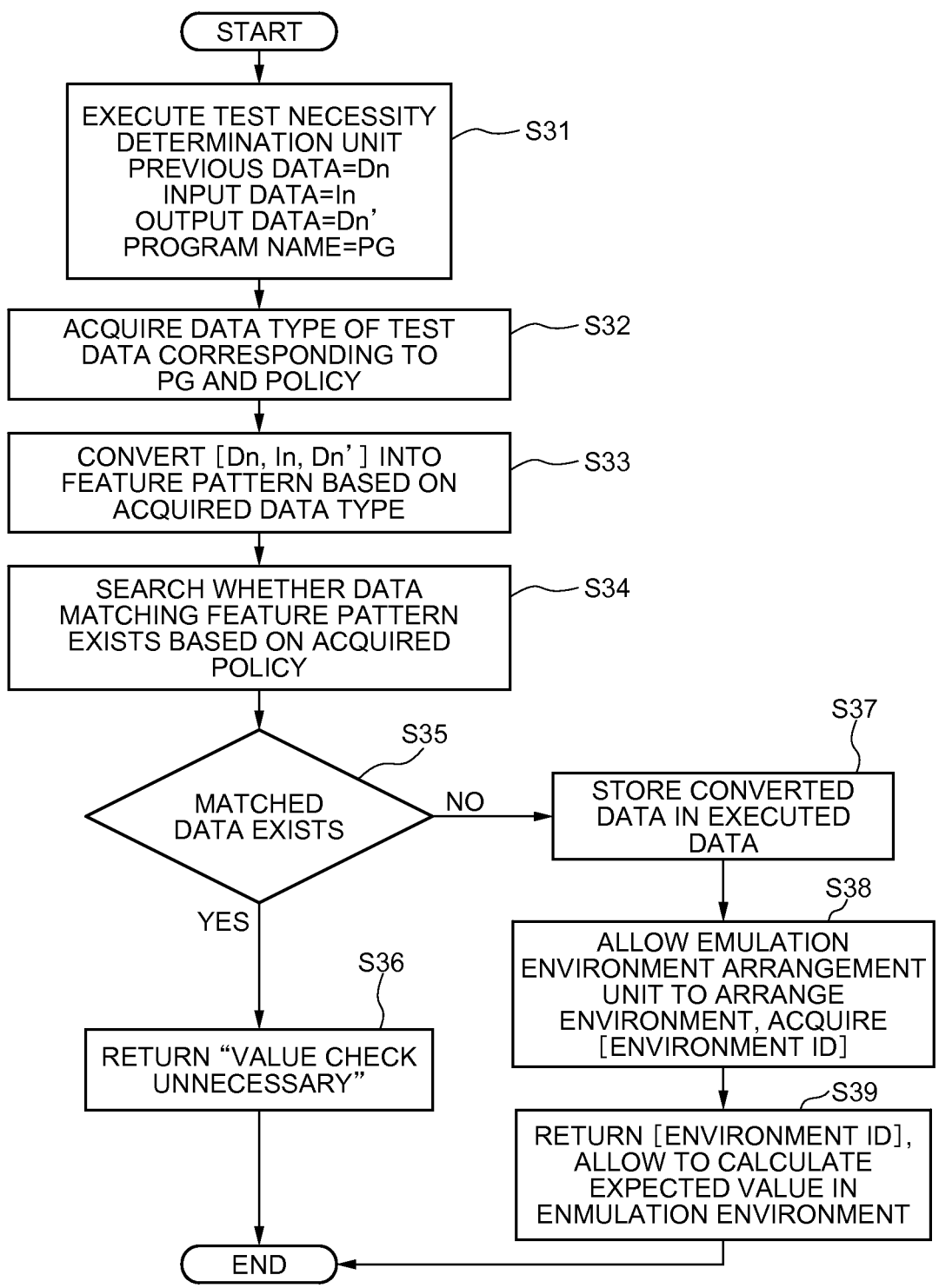
FIG. 10 is a flowchart showing an operation of the test necessity determination unit in the distributed processing system according to the third exemplary embodiment of the present invention.

In the present embodiment, the test necessity determination unit 341 performs processing shown in the flowchart of FIG. 10. First, the test data handler 346 of the test necessity determination unit 341 acquires a data type and a necessity policy matching the PG (program name) in the data [Dn, In, Dn', PG], from the data type 342 of the test data and the necessity policy 343 (steps S31, S32). Then, the test data handler 346 converts the data [Dn, In, Dn'] into a feature pattern according to the data type, using the data conversion unit 344 (step S33). Then, the test data handler 346 compares the data in the executed data 251 with the feature pattern based on the policy, using the data search unit 345 (step S34). The following steps S35 to S39 shown in FIG. 10 are the same as steps S24 to S28 of FIG. 7.

In FIG. 9, the upper table shows data received by the test necessity determination unit 341 from the comparison unit 261. The lower table shows examples of data types of test data and necessity policies. For example, when the test necessity determination unit 341 receives data ["man, 100", man +5%, 105, points], by using the data "points" as the key, the test necessity determination unit 341 acquires a data type ["gender, value", "gender, value", –] and a policy ["gender of Dn match" and "gender of In match"]. Next, the test necessity determination unit 341 converts the data ["man, 100", man +5%, 105] according to the data type and obtains ["man, 100", "man, 5", –]. Then, the test necessity determination unit 341 searches whether data corresponding to the policy ["gender of Dn match" and "gender of In match"] is presence or absence in the converted data and the executed data, and if there is matched data, the test necessity determination unit 341 determines that a test is unnecessary.

The configuration and the operation other than those described above are the same as those of the second exemplary embodiment.

Fourth Exemplary Embodiment

Figure 11:
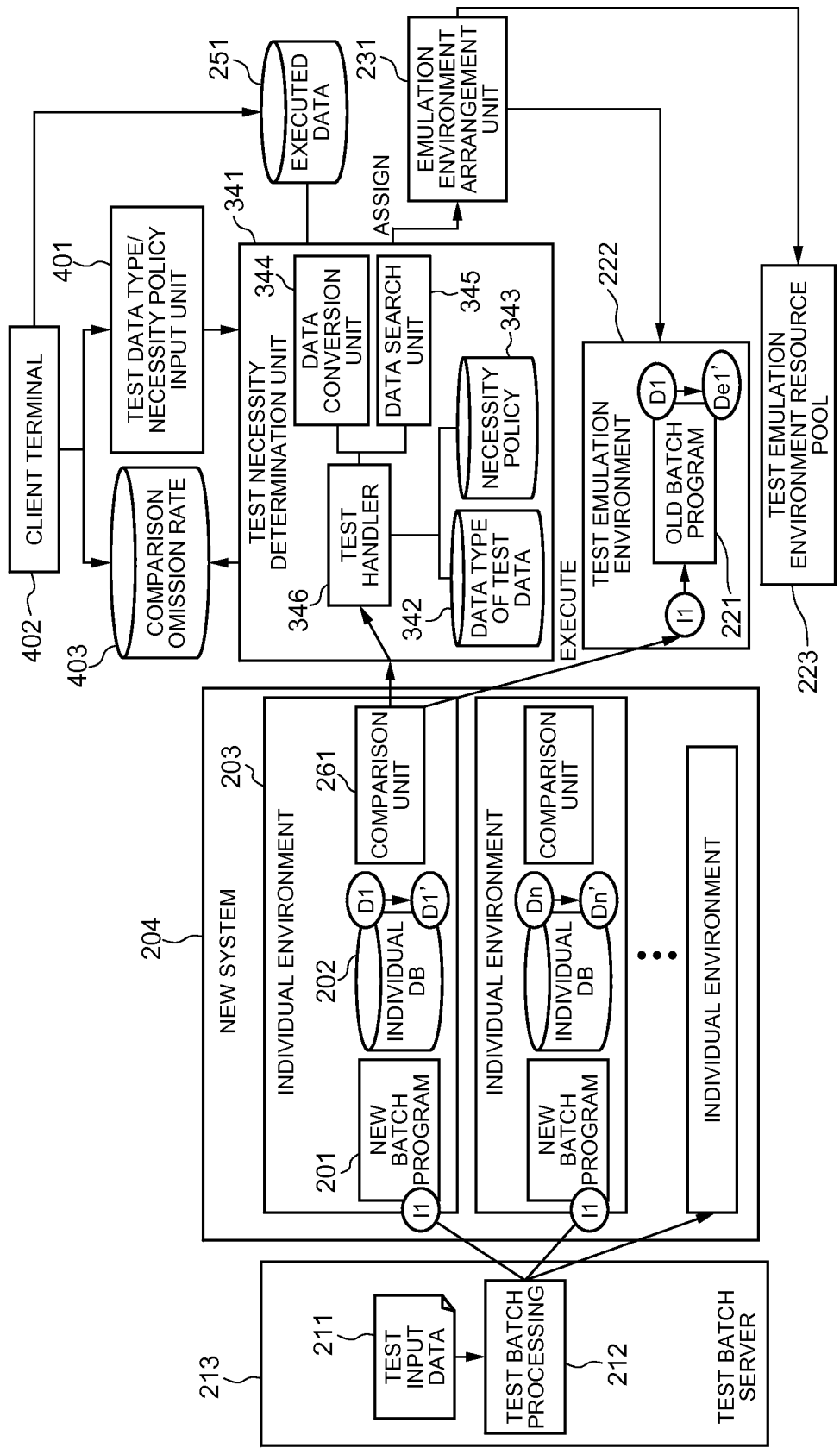
FIG. 11 is a block diagram showing a distributed processing system according to a fourth exemplary embodiment of the present invention.

FIG. 11 is a block diagram showing a distributed processing system according to a fourth exemplary embodiment. The present embodiment has a configuration that the data type 342 of the test data and the necessity policy 343 in the test necessity determination unit 341 are input from a client terminal 402 or are updated, using a test data type/necessity policy input unit 401. Further, when changing the data type 342 of test data and the necessity policy 343, the present embodiment has a configuration capable of referring to a comparison omission rate 403, which records, for each program, the rate of the number of cases determined that emulation is unnecessary by the test necessity determination unit 341 with respect to the entire number of tests, or referring to the executed data 251.

FIG. 12 shows examples of the comparison omission rate 403 in the present embodiment. If there are programs named "addition", "address change", "point" and the like similar to the case of the third exemplary embodiment, for each of the programs, the test necessity determination unit 241 calculates the rate of the number of times that test necessity determination unit 241 determines that emulation is unnecessary and returns "comparison unnecessary", with respect to the number of times that the comparison unit 261 inquires the test necessity determination unit 241 of the necessity, and records the rate.

For example, in the case where a test is performed in an environment where the data type 342 of a unit of test data and the necessity policy 343 are defined, if the number of patterns registered in the executed data 251 is small and the comparison omission rate 403 is high, it can be determined that tests have not been performed for a sufficient number of cases. In that case, by defining the data type 342 of the test data and the necessity policy 342 in detail (in the case of addition as shown in FIG. 9, not only positive and negative of values but also types of integer, real number, or imaginary number are added) and by setting high-level rules, it is possible to make an adjustment so as to perform tests for a sufficient number of cases. Further, in the case where emulation results by the old program are calculated for too many cases so that the comparison omission rate 403 is low, it is possible to make an adjustment so as to reduce the calculation cost of emulation by easing the data type 342 of the test data and the necessity policy 342. In this way, tradeoff between the coverage of the test cases and the cost of the tests is adjusted.

Fifth Exemplary Embodiment

Figure 13:
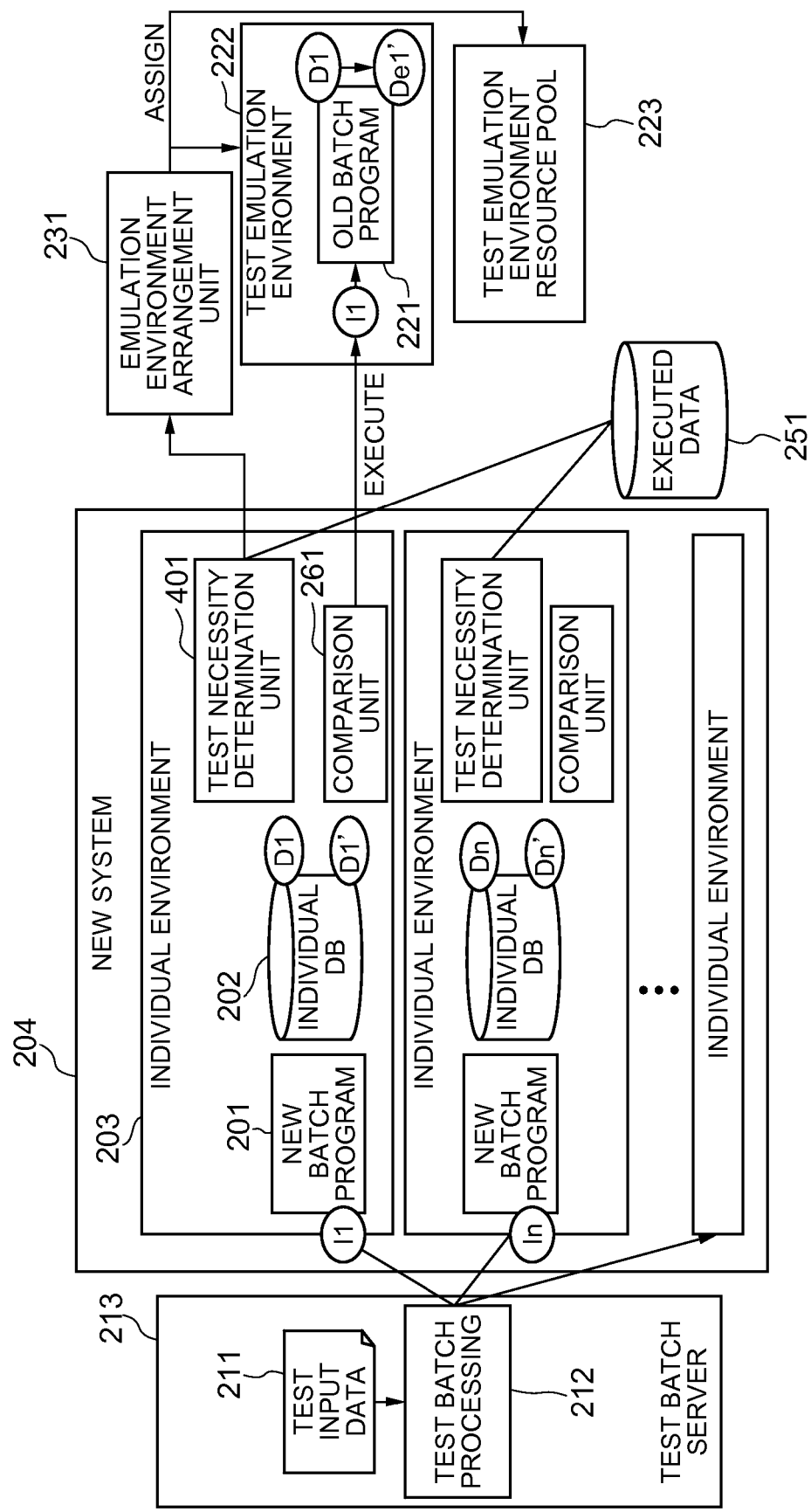
FIG. 13 is a block diagram showing a distributed processing system according to a fifth exemplary embodiment of the present invention.

FIG. 13 is a block diagram showing a distributed processing system according to a fifth exemplary embodiment of the present invention. In the present embodiment, a test necessity determination unit 401 is provided in each individual environment 203. This means that the present embodiment has an exemplary configuration in which the test necessity determination units are also operated in a distributed and parallel manner. In that case, the respective test necessity determination units 401 share the common executed data 251 using distributed shared memory or the like, for example.

If the parallelism of the new system 204 becomes high so that the load is concentrated on the test necessity determination units causing a bottleneck, by operating the test necessity determination units in a distributed and parallel manner, it is possible to prevent a state where the test necessity determination units themselves cause a bottleneck.

Sixth Exemplary Embodiment

Figure 14:
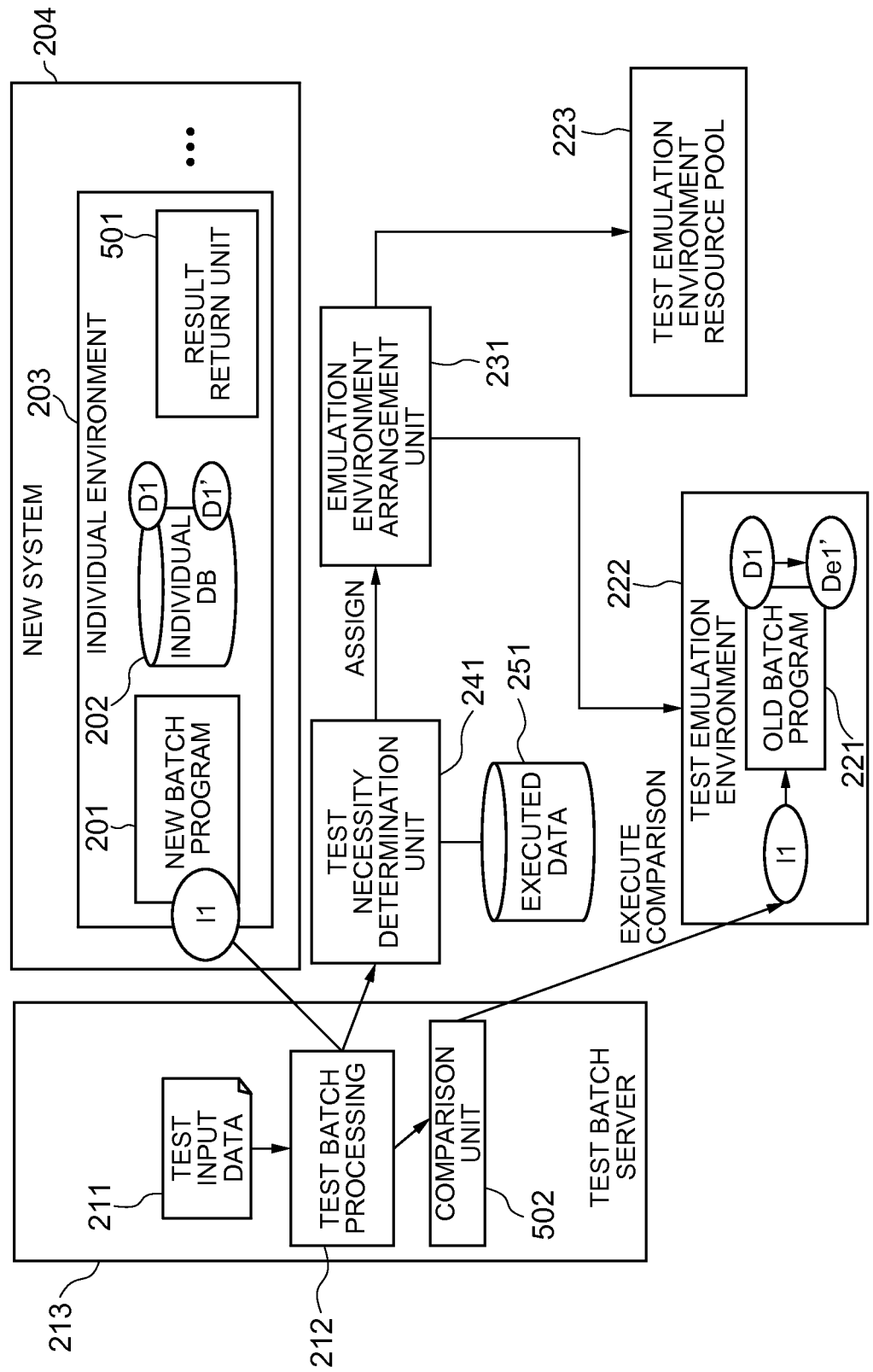
FIG. 14 is a block diagram showing a distributed processing system according to a sixth exemplary embodiment of the present invention.

FIG. 14 is a block diagram showing a distributed processing system according to a sixth exemplary embodiment of the present invention. The present embodiment includes a result return unit 501 instead of the comparison unit 261 provided in each of the individual environments 203 in the second to fifth exemplary embodiments, and also includes a comparison unit 502 on the test batch server 213 side. As such, the present embodiment is configured such that necessary data is returned from the test environment to the batch processing side, and the returned result is applied with comparison processing on the batch server side.

In the case of the second to fifth exemplary embodiments, as an extension of calculation by the new batch program 201 in each individual environment, determination by the test necessity determination unit and calculation of an emulation result by the old batch program 221 are performed via the comparison unit 261. On the other hand, in the present embodiment, when calculation by the new batch program 201 is completed, the result is immediately returned to the test batch processing 212 side. As such, the present embodiment is usable when it is desired to perform measurement of the processing time together on the individual environment 203.

While the present invention has been described with reference to the exemplary embodiments, the present invention is not limited to the exemplary embodiments disclosed above, and various additions and changes can be made therein. For example, the individual environments of the new system may be configured of physically-different information processing devices, or may be configured of virtual servers constructed on the same information processing device.

INDUSTRIAL APPLICABILITY

The present invention is applicable to verification of a distributed processing system, and in particular, to verification of a system for performing distributed parallel processing on a large quantity of data.

The whole or part of the exemplary embodiments disclosed above can be described as, but not limited to, the following supplementary notes.

(Supplementary Note 1)

A distributed processing system comprising:

a plurality of processing units that execute a program for performing predetermined processing in accordance with input data;

an input data supplying unit that supplies the input data to the program of the processing units;

an executed data storing unit that stores executed data relating to the input data having been tested;

a comparison necessity determination unit that generates a feature pattern of the input data, and determines whether or not the executed data having a feature pattern which is the same as the generated feature pattern is stored in the executed data storing unit;

an expected data calculation unit that, if the executed data having the feature pattern which is the same as the feature pattern of the input data is not stored in the executed data storing unit, calculates expected data which is expected as data to be obtained as a result of performing the predetermined processing in accordance with the input data; and a test result judging unit that, in a case where an error occurs so that processing of the program is not completed normally, determines that a test performed by using the input data failed, and in a case where an error does not occur so that processing of the program is completed normally, if the executed data having the feature pattern which is the same as the feature pattern of the input data is stored in the executed data storing unit, determines that the test performed by using the input data succeeded, while if the executed data having the feature pattern which is the same as the feature pattern of the input data is not stored in the executed data storing unit, judges a result of the test performed by using the input data based on a result of comparing the calculated expected data with result data of the program.

(Supplementary Note 2)

The distributed processing system, according to supplementary note 2, wherein the feature pattern is data representing a category to which the input data belongs.

(Supplementary Note 3)

The distributed processing system, according to supplementary note 1 or 2, wherein the feature pattern is data representing a category to which the input data belongs if the predetermined processing is processing to update data in a database of each of the processing units in accordance with the input data, and also representing a category to which at least one of pre-update data and updated data belongs.

(Supplementary Note 4)

The distributed processing system, according to any of supplementary notes 1 to 3, wherein the executed data is the feature pattern.

(Supplementary Note 5)

The distributed processing system, according to any of supplementary notes 1 to 3, wherein the executed data is data which is the source of generating the feature pattern.

(Supplementary Note 6)

The distributed processing system, according to any of supplementary notes 1 to 5, wherein the executed data includes an identifier specifying the program, and the comparison necessity determination unit investigates whether or not the executed data, having an identifier which is the same as the identifier specifying the program and having the feature pattern which is the same as the generated feature pattern, is stored in the executed data storing unit.

(Supplementary Note 7)

The distributed processing system, according to any of supplementary notes 1 to 6, wherein the expected data calculation unit calculates, if the program corresponds to a new program of two old and new programs, data to be obtained as a result of performing the predetermined processing in accordance with the input data by the old program, as the expected data.

(Supplementary Note 8)

The distributed processing system, according to any of supplementary notes 1 to 7, wherein the expected data calculation unit includes a resource pool of a test emulation environment for calculating the expected data, and an emulation environment arrangement unit that calculates the expected data by acquiring a resource of the test emulation environment from the resource pool.

(Supplementary Note 9)

The distributed processing system, according to any of supplementary notes 1 to 8, wherein the comparison necessity determination unit has a rule for generating the feature pattern in association with an identifier specifying the program, and generates the feature pattern in accordance with the rule.

(Supplementary Note 10)

The distributed processing system, according to any of supplementary notes 1 to 9, wherein the comparison necessity determination unit calculates, for each of the programs, a rate of the number of tests determined to be successful, in which the comparison has been omitted, with respect to the total number of tests, as a comparison omission rate.

(Supplementary Note 11)

A test method to be executed by a distributed processing system, the distributed processing system including a plurality of processing units that execute a program for performing predetermined processing in accordance with input data, an input data supplying unit, a comparison necessity determination unit, an expected data calculation unit, a comparison unit, and an executed data storing unit that stores executed data relating to the input data having been executed, the method comprising:

by the input data supplying unit, supplying the input data to the program running on the processing units;

by the program of the processing units, performing the predetermined processing in accordance with the input data;

by the comparison necessity determination unit, generating a feature pattern of the input data, and investigating whether or not the executed data having a feature pattern which is the same as the generated feature pattern is stored in the executed data storing unit;

by the expected data calculation unit, if the executed data having the feature pattern which is the same as the feature pattern of the input data is not stored in the executed data storing unit, calculating expected data which is expected as data to be obtained as a result of performing the predetermined processing in accordance with the input data; and by the comparison unit, in a case where an error occurs so that processing of the program is not completed normally, determining that a test performed by using the input data failed, and in a case where an error does not occur so that processing of the program is completed normally, if the executed data having the feature pattern which is the same as the feature pattern of the input data is stored in the executed data storing unit, determining that the test performed by using the input data succeeded, while if the executed data having the feature pattern which is the same as the feature pattern of the input data is not stored in the executed data storing unit, judging a result of the test performed by using the input data based on a result of comparing the calculated expected data with result data of the program.

(Supplementary Note 12)

The test method for the distributed processing system, according to supplementary note 11, wherein the feature pattern is data representing a category to which the input data belongs.

(Supplementary Note 13)

The test method for the distributed processing system, according to supplementary note 11 or 12, wherein the feature pattern is data representing a category to which the input data belongs if the predetermined processing is processing to update data in a database of each of the processing units in accordance with the input data, and also representing a category to which at least one of pre-update data and updated data belongs.

(Supplementary Note 14)

The test method for the distributed processing system, according to any of supplementary notes 11 to 13, wherein the executed data is the feature pattern.

(Supplementary Note 15)

The test method for the distributed processing system, according to any of supplementary notes 11 to 13, wherein the executed data is data which is the source of generating the feature pattern.

(Supplementary Note 16)

The test method for the distributed processing system, according to any of supplementary notes 11 to 15, wherein the executed data includes an identifier specifying the program, and in the investigating, the comparison necessity determination unit investigates whether or not the executed data, having an identifier which is the same as the identifier specifying the program and having the feature pattern which is the same as the generated feature pattern, is stored in the executed data storing unit.

(Supplementary Note 17)

The test method for the distributed processing system, according to any of supplementary notes 11 to 16, wherein the expected data calculation unit calculates, if the program corresponds to a new program of two old and new programs, data to be obtained as a result of performing the predetermined processing in accordance with the input data by the old program, as the expected data.

(Supplementary Note 18)

The test method for the distributed processing system, according to any of supplementary notes 11 to 17, wherein the expected data calculation unit calculates the expected data by acquiring, from a resource pool of a test emulation environment for calculating the expected data, a resource of the test emulation environment.

(Supplementary Note 19)

The test method for the distributed processing system, according to any of supplementary notes 11 to 18, wherein the comparison necessity determination unit has a rule for generating the feature pattern in association with the identifier specifying the program, and generates the feature pattern in accordance with the rule.

(Supplementary Note 20)

The test method for the distributed processing system, according to any of supplementary notes 11 to 19, wherein the comparison necessity determination unit calculates, for each of the programs, a rate of the number of tests determined to be successful, in which the comparison has been omitted, with respect to the total number of tests, as a comparison omission rate.

The invention claimed is:

1. A test method for a distributed processing system including a plurality of processing units that execute a program for performing predetermined processing in accordance with input data, the method comprising:

supplying input data to the program running on the processing units;

generating a feature pattern of the supplied input data, determining whether or not a feature pattern which is the same as the generated feature pattern is stored in a storing unit that stores feature patterns corresponding to previously tested input data, and if the feature pattern which is the same as the generated feature pattern is not stored, calculating expected data which is data expected to be obtained as a result of performing the predetermined processing in accordance with the supplied input data;

determining, in a case where an error occurs so that the predetermined processing of the program is not completed normally, that a test performed by using the supplied input data failed; and in a case where an error does not occur so that the predetermined processing of the program in accordance with the supplied input data is completed normally;

determining, if the feature pattern which is the same as the generated feature pattern of the input data is stored in the storing unit, that the test performed by using the supplied input data succeeded; and determining, if the feature pattern which is the same as the generated feature pattern of the input data is not stored in the storing unit, a result of the test performed by using the supplied input data by comparing the calculated expected data with result data of the program.

2. The test method for the distributed processing system, according to claim 1, wherein a feature pattern is data representing a category to which corresponding input data belongs.

3. The test method for the distributed processing system, according to claim 1, wherein a feature pattern is data representing a category to which corresponding input data belongs, and, if the predetermined processing is processing to update data in a database of each of the processing units in accordance with the input data, also representing a category to which at least one of the data in the database before the processing to update the data and the data in the database after the processing to update the data in the database belongs.

4. The test method for the distributed processing system, according to claim 1, wherein the storing unit stores a set of the feature patterns and an identifier specifying a corresponding program, and the determining whether or not a feature pattern which is the same as the generated feature pattern is stored in a storing unit includes determining whether or not an identifier, which is the same as an identifier of the executed program, and the feature pattern, which is the same as the generated feature pattern, is stored in the storing unit.

5. The test method for the distributed processing system, according to claim 1, wherein the calculating the expected data includes, if the program corresponds to a new program that replaces an old program, calculating, as the expected data, data to be obtained as a result of performing the predetermined processing in accordance with the supplied input data input to the old program.

6. The test method for the distributed processing system, according to claim 1, wherein the calculating the expected data includes calculating the expected data by acquiring, from a resource pool of test emulation environments, a test emulation environment to generate an emulation result as the expected data.

7. The test method for the distributed processing system, according to claim 1, wherein the generating the feature pattern is performed in accordance with a rule for generating the feature pattern, the rule having been stored in association with an identifier of the executed program.

8. A distributed processing system comprising:

a plurality of processing units configured to execute a program for performing predetermined processing in accordance with input data;

an input data supplying unit configured to supply input data to the program of the processing units;

a storing unit that stores feature patterns corresponding to previously tested input data;

a comparison necessity determination unit configured to generate a feature pattern of the supplied input data, and determine whether or not a feature pattern which is the same as the generated feature pattern is stored in the storing unit;

an expected data calculation unit configured to, if the feature pattern which is the same as the generated feature pattern is not stored in the storing unit, calculate expected data which is data expected to be obtained as a result of performing the predetermined processing in accordance with the supplied input data; and a test result judging unit configured to, in a case where an error occurs so that the predetermined processing of the program is not completed normally, determine that a test performed by using the supplied input data failed, and, in a case where an error does not occur so that the predetermined processing of the program in accordance with the supplied input data is completed normally, if the feature pattern which is the same as the generated feature pattern of the input data is stored in the storing unit, determine that the test performed by using the supplied input data succeeded, and, if the feature pattern which is the same as the generated feature pattern of the input data is not stored in the storing unit, determine a result of the test performed by using the supplied input data by comparing the calculated expected data with result data of the program.

9. The distributed processing system, according to claim 8, wherein
a feature pattern is data representing a category to which corresponding input data belongs.

10. The distributed processing system, according to claim 8, wherein
a feature pattern is data representing a category to which corresponding input data belongs, and, if the predetermined processing is processing to update data in a database of each of the processing units in accordance with the input data, also representing a category to which at least one of the data in the database before the processing to update the data and the data in the database after the processing to update the data in the database belongs.

11. The distributed processing system, according to claim 8, wherein
the storing unit is further configured to store a set of the feature patterns and an identifier specifying a corresponding program, and
the comparison necessity determination unit is further configured to determine whether or not an identifier, which is the same as an identifier of the executed program, and the feature pattern, which is the same as the generated feature pattern, is stored in the storing unit.

12. The distributed processing system, according to claim 8, wherein
the expected data calculation unit is further configured to calculate, if the program corresponds to a new program that replaces an old program, data to be obtained as a result of performing the predetermined processing in accordance with the supplied input data input to the old program, as the expected data.

13. The distributed processing system, according to claim 8, wherein
the expected data calculation unit is further configured to calculate the expected data by acquiring, from a resource pool of test emulation environments, a test emulation environment to generate an emulation result as the expected data.

14. The distributed processing system, according to claim 8, wherein
the comparison necessity determination unit is further configured to generate the generated feature pattern in accordance with a rule for generating the feature pattern, the rule having been stored in association with an identifier of the executed program.

15. A distributed processing system comprising:
a plurality of processing means for executing a program for performing predetermined processing in accordance with input data;

input data supplying means for supplying input data to the program of the plurality of the processing means;

storing means for storing feature patterns corresponding to previously tests input data;

comparison necessity determination means for generating a feature pattern of the supplied input data, and determining whether or not a feature pattern which is the same as the generated feature pattern is stored in the storing means;

expected data calculation means for, if the feature pattern which is the same as the generated feature pattern is not stored in the storing unit, calculating expected data which is data expected to be obtained as a result of performing the predetermined processing in accordance with the supplied input data; and test result judging means for, in a case where an error occurs so that the predetermined processing of the program is not completed normally, determining that a test performed by using the supplied input data failed, and, in a case where an error does not occur so that the predetermined processing of the program in accordance with the supplied input data is completed normally, if the feature pattern which is the same as the generated feature pattern of the input data is stored in the storing means, determining that the test performed by using the supplied input data succeeded, and, if the feature pattern which is the same as the generated feature pattern of the input data is not stored in the storing means, determining a result of the test performed by using the supplied input data by comparing the calculated expected data with result data of the program.

\* \* \* \* \*